United States Patent
Smith

(10) Patent No.: US 7,075,008 B2
(45) Date of Patent: Jul. 11, 2006

(54) UNIVERSAL WIRE GUARD

(76) Inventor: John T. Smith, 264 Oak Grove La., Galena, MO (US) 65686

( * ) Notice: Subject to any disclaimer, the term of this patent is extended or adjusted under 35 U.S.C. 154(b) by 0 days.

(21) Appl. No.: 11/059,283

(22) Filed: Feb. 16, 2005

(65) Prior Publication Data
US 2005/0194173 A1    Sep. 8, 2005

Related U.S. Application Data

(60) Provisional application No. 60/549,473, filed on Mar. 2, 2004.

(51) Int. Cl.
H02G 3/14 (2006.01)

(52) U.S. Cl. .......................... 174/66; 174/67; 220/241

(58) Field of Classification Search ................ 174/66, 174/67; 220/241, 242
See application file for complete search history.

(56) References Cited

U.S. PATENT DOCUMENTS 3,609,647 A * 9/1971 Castellano .................. 439/535
5,639,991 A * 6/1997 Schuette ...................... 174/58
6,103,974 A * 8/2000 Erdfarb ....................... 174/66
6,653,566 B1 * 11/2003 Petak et al. .................. 174/66

* cited by examiner

Primary Examiner—Dhiru R. Patel
(74) Attorney, Agent, or Firm—Lathrop & Gage LC

(57) ABSTRACT

A wire guard for filling an opening in an electrical box, to protect contents contained therein, includes a plate having a circumferential wall projecting outward from the plate at a defined angle. The wall extends for a length of a perimeter of the plate, contacting an interior surface of the electrical box when the plate fills the opening. At least one bracket of the wire guard surrounds a tab formed in the electrical box. Further, an aperture in the bracket aligns with a bore hole in the tab. A mechanical fastener, e.g. a screw, may be inserted into the aperture to engage with the bore hole of the tab, thereby fastening the wire guard to the electrical box. A screw driver or other tool, inserted into an aperture in the plate, may be used to extract the wire guard from the electrical box after use.

11 Claims, 4 Drawing Sheets

UNIVERSAL WIRE GUARD

RELATED APPLICATIONS

This application is a nonprovisional application of U.S. Provisional Patent Application Ser. No. 60/549,473, filed Mar. 2, 2004. The aforementioned application is incorporated herein by reference.

FIELD OF THE INVENTION

This invention relates generally to a cover placed in the opening of an electrical box to protect the contents therein. More particularly, this invention relates to a wire guard installed in an electrical box to protect wires and other components therein during construction activities which may damage or destroy the contents of the electrical box.

BACKGROUND

During a construction project, such as the construction of a house or an office building, an electrician wires the structure. In particular, the electrician will route electrical wires throughout the structure, terminating the wires in electrical boxes mounted to wall studs, etc. Typically, the wiring activities occur well before the dry wall is hung and finished, and the walls are textured and painted. The electrical box is most often left open, exposing the contents (wires, etc.) to damage during subsequent construction activities (dry walling, painting, etc.).

In particular, sheet rock or dry wall is nailed or screwed to the walls of the structure, completely covering the electrical boxes and the contents therein. After the sheet rock or dry wall is hung, the installer must locate all of the now covered electrical boxes. Once located, the installer must cut holes in the wall to allow access to these boxes. Typically, a pilot hole is drilled into the wall, after which a hole of approximately the same dimensions as the electrical box is cut in the wall using a router or similar tool.

In many instances, wires are damaged or destroyed by the drill bit used for the pilot hole. Further, as the installer cuts around the box, damage to the box and its contents may occur. Even if the installer is successful in locating the electrical box and cutting an accurate hole in the wall, he or she still must later tape, mud, paint and finish the wall. During these finishing steps, damage to wires may occur. Additionally, contaminants may get into the electrical box, covering exposed wire ends, obstructing mounts for switches, sockets or other devices, and/or otherwise damaging the box.

Frayed, damaged or destroyed wires must be replaced or repaired. Often times these repairs involve pulling hundreds of feet of wire from the structure. Also, there is an increased risk of electrical problems and fires, especially if not all damaged boxes are adequately located and repaired. The cost to rewire all or part of a structure due to the damage discussed above can be significant.

SUMMARY

The universal wire guard of the present invention advances the art and overcomes problems articulated above by providing a cover to isolate and protect wires contained within an electrical box.

In particular, and by way of example only, according to an embodiment, a wire guard for filling an opening in an electrical box, to protect contents contained therein, comprises a plate having a first side and opposite thereto a second side, and an aperture; and, a circumferential wall projecting from the first side, wherein the dimensions of the plate and the wall are defined to allow the wire guard to fit within an interior cavity of the electrical box and fill the opening.

DETAILED DESCRIPTION

The present teaching is by way of example, not by limitation. The concepts herein are not limited to use or application with one specific type of universal wire guard. Thus, although the instrumentalities described herein are for the convenience of explanation, shown and described with respect to exemplary embodiments, these principals may be equally applied in other types of universal wire guards.

Figure 1:
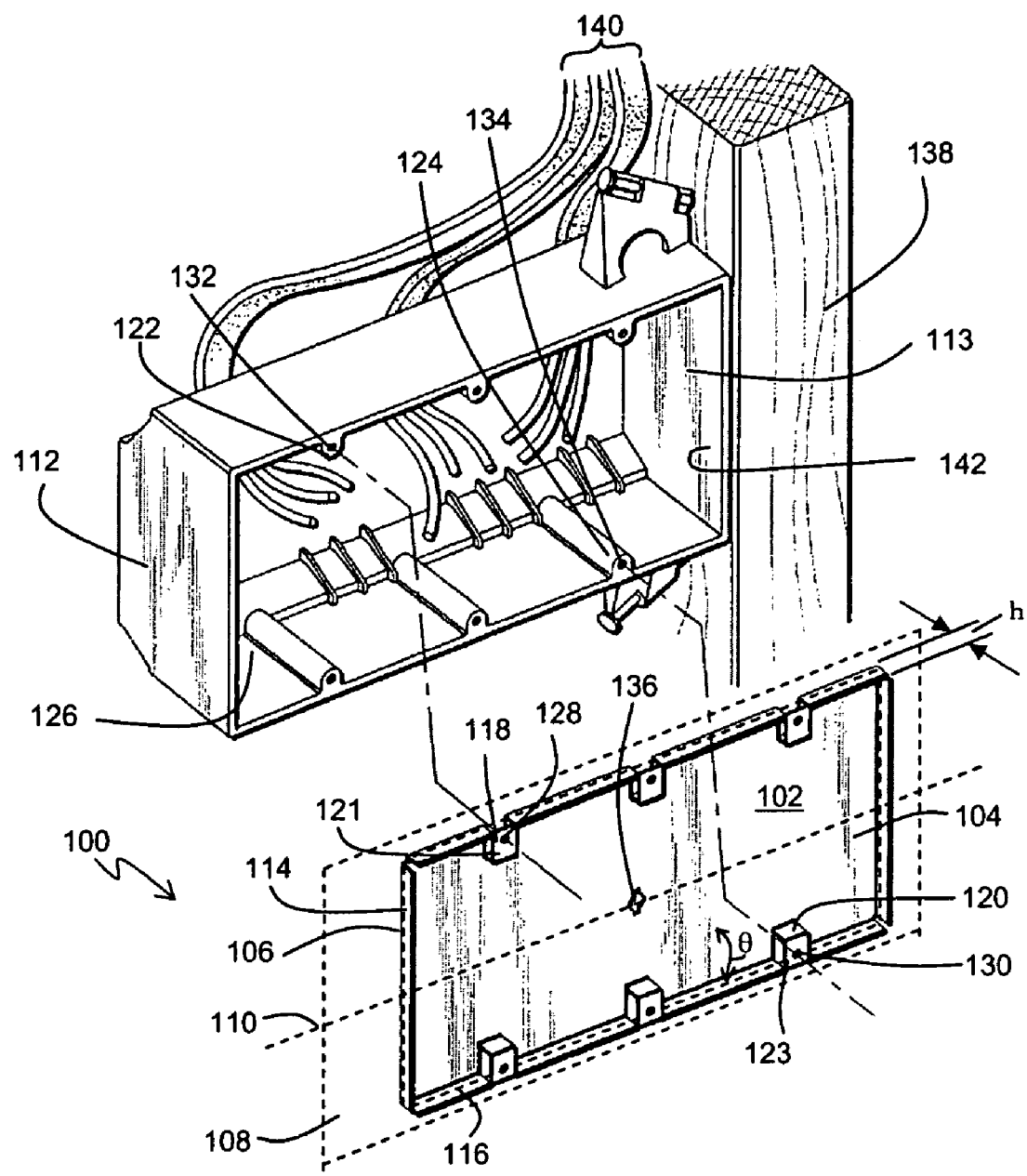
FIG. 1 is a perspective view of a wire guard for protecting the contents of an electrical box, according to an embodiment.

A wire guard is shown in FIG. 1 and generally designated 100. The wire guard 100 may be manufactured of any rigid material (e.g. plastic, aluminum). In at least one embodiment, wire guard 100 is steel, for example, 18 or 20 gauge steel. Alternatively, wire guard 100 may be made of a flexible material.

Figure 5:
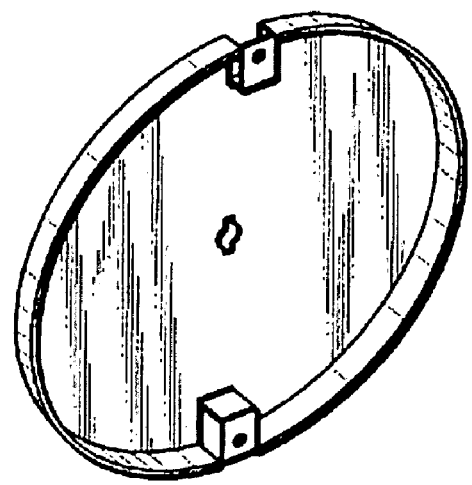
FIG. 5 is a perspective view of a circular wire guard, according to an embodiment.

The wire guard 100 comprises a plate 102 having a first surface 104 and a second surface 106. In one embodiment, plate 102 is substantially flat and defines a plane 108. In another embodiment, plate 102 is rectangular and defines a longitudinal axis 110, as shown in FIG. 1. In at least one alternative embodiment, plate 102 may be square. In yet another alternative embodiment, plate 102 may be circular (FIG. 5). Further, in an alternative embodiment, such as for use with a curved wall, plate 102 may be curved.

The geometric shape and dimensions of plate 102 are defined, in part, by the geometry of a given electrical box 112 to be protected, and the geometry of an opening 113 in the box 112. As such, plate 102 can be manufactured to interface with any electrical box 112, the geometry of which is known.

The plate 102 includes a wall 114 extending for a length of a perimeter 116 of plate 102. In other words, wall 114 is circumferential about plate 102. The wall 114 may be continuous, or alternatively, it may be segmented. As can be appreciated by referring to FIG. 1, wall 114 projects outward, away from surface 104 and out of plane 108 for a predetermined height "h". In at least one embodiment, the height "h" is ½ inch. The angle "θ" formed between wall 114 and surface 104 of plate 102 may be greater than, equal to, or less than 90°, depending on the geometry of the corresponding electrical box 112.

Still referring to FIG. 1, wire guard 100 may include at least one bracket positioned along perimeter 116, of which brackets 118 and 120 are exemplary. The brackets 118, 120 each interface with and surround a tab, such as tabs 122 and 124 respectively, formed in electrical box 112. More specifically, brackets 118 and 120 interface with and surround tabs 122 and 124 respectively when wire guard 100 is inserted into a cavity 126 in electrical box 112.

As shown, brackets 118 and 120 each have a flange, flanges 121 and 123 respectively. Further, in at least one embodiment, each flange 121, 123 has an aperture, apertures 128 and 130 respectively. When wire guard 100 is properly positioned in cavity 126, apertures 128 and 130 align with bore holes 132 and 134 respectively in tabs 122 and 124. In this configuration, screws or bolts (not shown) inserted through apertures 128 and 130 engage bore holes 132 and 134 respectively, thereby securing wire guard 100 to electrical box 112.

In an alternative embodiment, each flange 121, 123 includes a mating member (not shown) intended to mate with bore holes 132, 134. As mating members may be made of rubber or other compressible material, when pressed into bore holes 132, 134 they will bind wire guard 100 to electrical box 112 by friction/expansion hold. In yet another alternative embodiment, each flange 121, 123 is solid and thereby protects bore holes 132, 134 from debris or the like.

Figure 2:
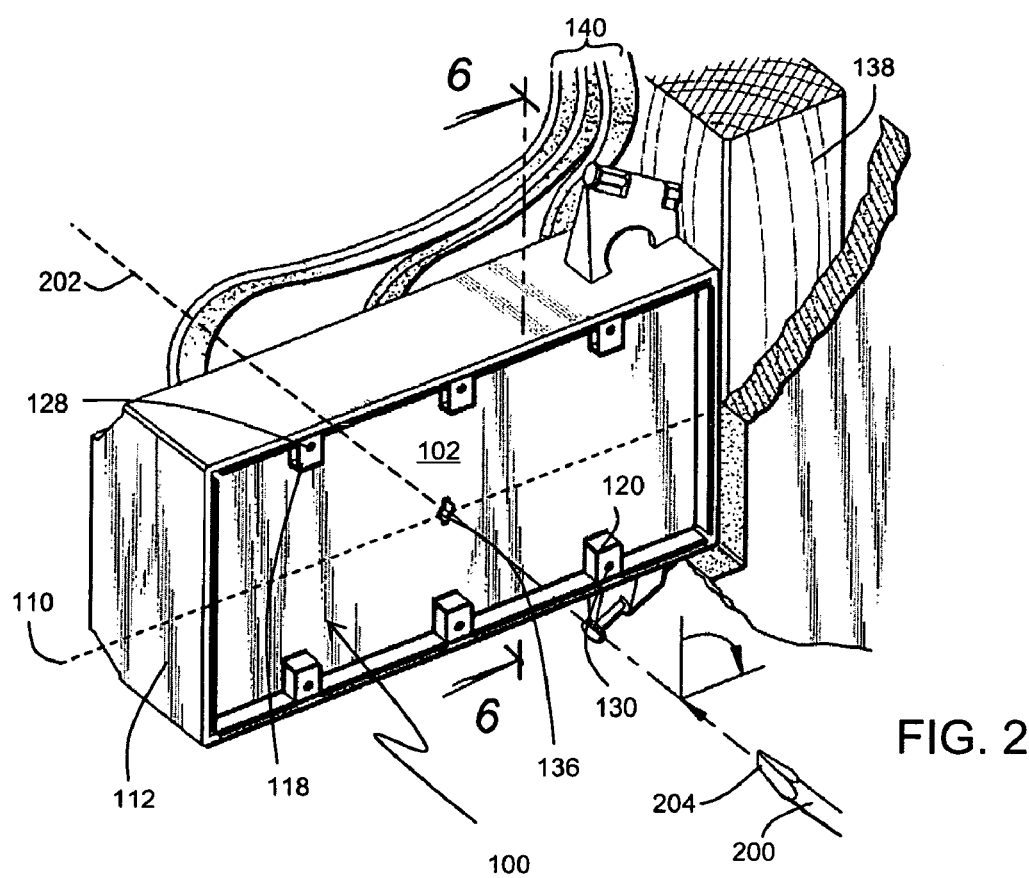
FIG. 2 is a perspective view of the wire guard of FIG. 1, positioned to fill an opening in the electrical box, according to an embodiment.

In addition to brackets 118 and 120, plate 102 may include an aperture, such as aperture 136 positioned generally in the center of plate 102. The aperture 136 is of sufficient size to allow for insertion of a tool, such as a screw driver 200 (FIG. 2). More specifically, aperture 136 is shaped to accept a tool when the tool is inserted with a specific orientation. For example, as shown in FIG. 2, screw driver 200 may be inserted into through aperture 136 along axis 202 when the blade 204 of screw driver 200 is oriented substantially perpendicular to axis 110.

As shown in FIG. 1 and FIG. 2, electrical box 112 may be mounted to a construction stud 138 or other surface. Further, a plurality of electrical wires 140 are fed into box 112. One end of wires 140 is contained within electrical box 112, and subsequently guarded or protected by wire guard 100 when wire guard 100 is installed. It is understood and appreciated that optical fibers, cables, strings, pipes, tubes or other materials may have terminating ends in box 112 which may be protected, in addition to or in place of wires 140, by wire guard 100.

Figure 3:
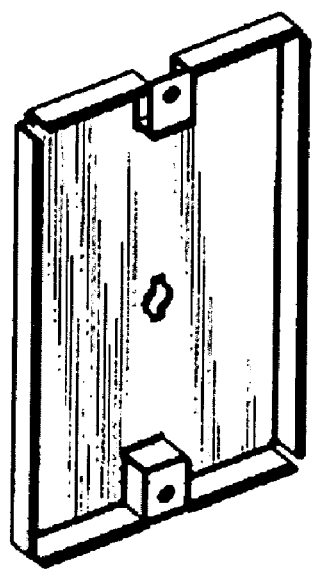
FIG. 3 is a perspective view of a vertically rectangular wire guard, according to an embodiment.

Operationally, a wire guard 100 having a geometry and dimensions corresponding to a given electrical box 112 is selected. As stated above and represented in FIGS. 3–5, the wire guard 100 may be, for example, rectangular (FIGS. 3, 4) or circular (FIG. 5). The wire guard 100 is selected to fit at least partially within cavity 126 of electrical box 112. More specifically, wire guard 100 is selected to substantially fill cavity 126. In at least one embodiment, an appropriately selected wire guard 100 may be described as having a snug fit in cavity 126. The selected wire guard 100 is inserted into cavity 126 prior to any dry walling, plastering, or other construction activities that may otherwise damage wires 140 contained within electrical box 112. In at least one embodiment, wire guard 100 nests within cavity 126 such that wire guard 100 is substantially flush with electrical box 112 as shown in FIG. 2.

Figure 6:
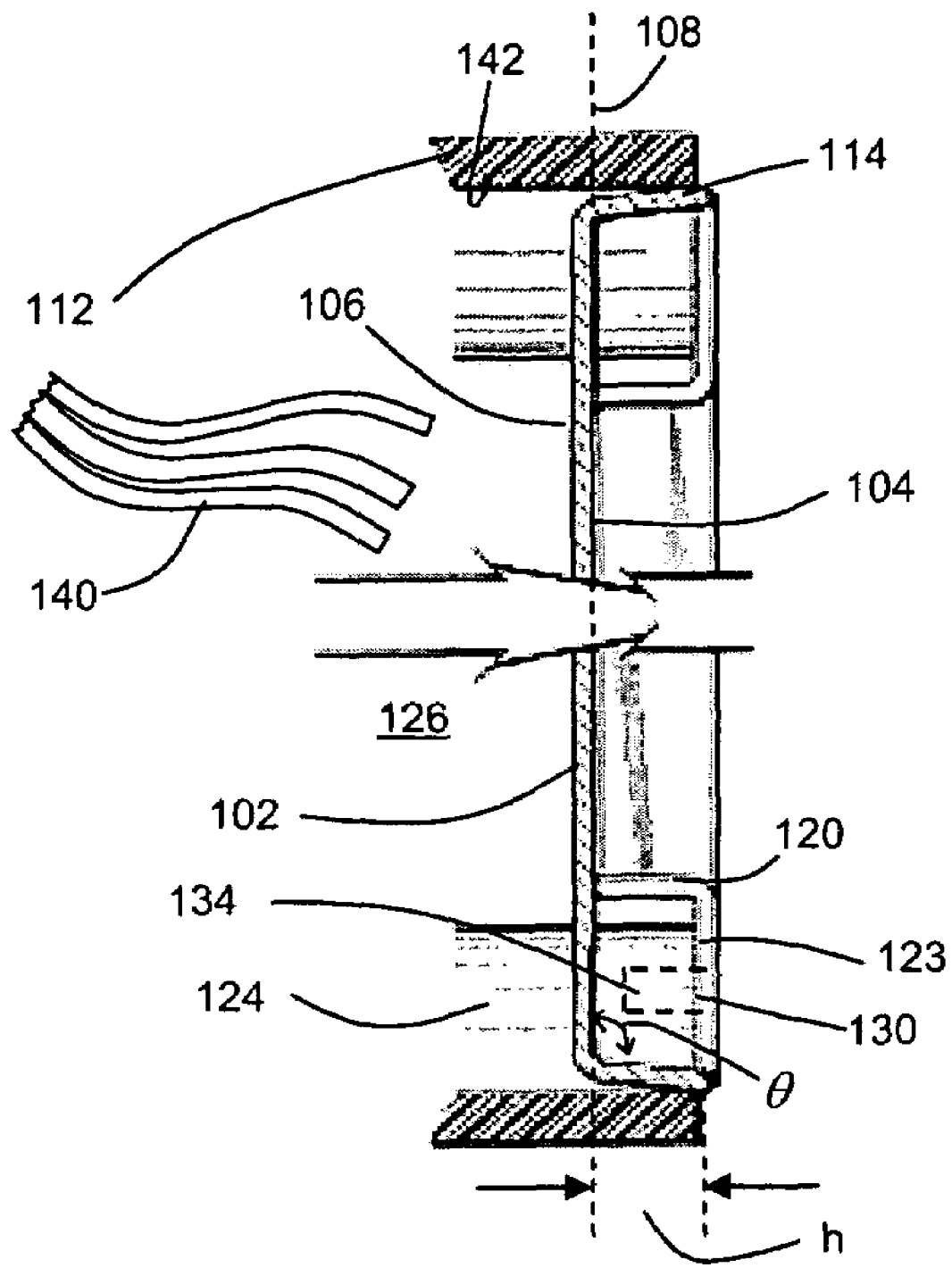
FIG. 6 is a cross-sectional view of a wire guard positioned to fill an opening in an electrical box, according to an embodiment.

Referring now to FIG. 6, a cross-sectional view of one embodiment of wire guard 100 inserted into cavity 126 to fill opening 113 in electrical box 112 is presented. In this embodiment, when wire guard 100 is inserted into electrical box 112, perimeter wall 114 of wire guard 100 contacts at least a portion of an inner surface 142 of electrical box 112. In at least one embodiment, the dimensions of wire guard 100 are such that wall 114 contacts inner surface 142 along the entire perimeter 116 of plate 102, the angle "θ" is greater than 90°, causing, wire guard 100 to be essentially "wedged" into cavity 126 of electrical box 112. In this configuration, wire guard 100 remains in place, protecting wires 140, without the use of any additional mechanical fastening devices or techniques.

Still referring to FIG. 6, wire guard 100 is inserted into cavity 126 until, for example, bracket 120 contacts tab 124. In this configuration, each bracket, e.g. 118, 120, contacts a corresponding tab, e.g. 122, 124. Plate 102 is positioned inside the cavity 126 a distance equal to approximately the height "h" of wall 114. In an embodiment providing aperture 130, aperture 130 aligns with bore hole 134, such that a screw or bolt (not shown) inserted into aperture 130 engages bore hole 134. Similarly, in an alternative embodiment, a mating member (not shown) extending inwardly from bracket 120 will align with and engage bore hole 134.

As may be appreciated with respect to FIG. 2 and FIG. 6, wire guard 100 protects opening 113 of electrical box 112 by occupying a portion of cavity 126. Wire guard 100 may therefore protect wires 140 within electrical box 112, and/or tab 124, from debris or materials as may be used in the finishing of the wall. In at least one embodiment, wire guard 100 is inserted into electrical box 112 to be substantially flush with electrical box 112. As such, wire guard 100 may be easily covered and concealed for removal at a later date.

In one embodiment, one or more screws or bolts fasten wire guard 100 to electrical box 112. Although not required, the addition of mechanical fasteners helps to ensure that wire guard 100 remains properly installed until intentionally removed after the dry wall, plastering, etc. work has been completed.

When removing wire guard 100 from electrical box 112, a tool, e.g. a screw driver 200, may be used to extract guard 100 from cavity 126. In one embodiment, as shown in FIG. 2, a standard flat tip screw driver 200 may be inserted into aperture 136 substantially along axis 202. After insertion, screw driver 200 is rotated a quarter turn. FIG. 2 depicts rotation of the screw driver 200 clockwise 90°. After rotation, screw driver 200 can no longer be removed from aperture 136, as the width of the blade 204 of screw driver 200 is greater than the width of aperture 136. Stated differently, any force exerted on screw driver 200 along axis 202, in an attempt to withdraw screw driver 200, will cause blade 204 of screw driver 200 to contact surface 106. Any further force exerted in withdrawing screw driver 200 will result in plate 102 being extracted from cavity 126. In this manner, wire guard 100 is removed from electrical box 112.

Figure 4:
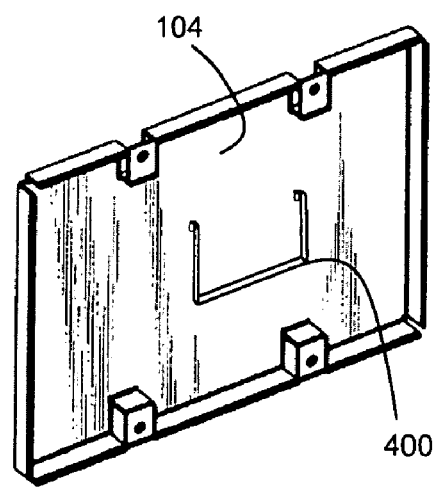
FIG. 4 is a perspective view of a horizontally rectangular wire guard, according to an embodiment

In yet another embodiment, as shown in FIG. 4, a handle 400 may be mounted to plate 102 for extracting wire guard 100 from cavity 126. The handle 400 may be positioned in a channel (not shown) of plate 102, such that handle 400 is flush with surface 104. Alternatively, handle 400 may lie on top of surface 104.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A protective wire guard for filling an opening in an electrical box that has an interior cavity and one or more tabs for use in fastening a cover, comprising:
   a plate having an aperture for receiving a removal tool; and
   a perimeter wall projecting from the plate at a defined angle to present a contact surface of complementary dimensions for engagement with an interior cavity of the electrical box to facilitate retention of the protective wire guard when the protective wire guard is positioned to fill the opening;
   wherein the dimensions of the plate and wall are defined to allow the wire guard to fit within an interior cavity of the electrical box to thereby fill the opening,
   the perimeter wall surrounding the plate and being interrupted to accommodate the one or more tabs for entry of the plate into the opening.

2. The wire guard of claim 1, wherein the plate is curved.

3. The wire guard of claim 1, wherein the plate is substantially flat.

4. The wire guard of claim 1, wherein the plate is substantially rectangular.

5. The wire guard of claim 1, wherein the plate is substantially circular.

6. The wire guard of claim 1, wherein the circumferential wall is continuous.

7. The wire guard of claim 1, wherein the circumferential wall is segmented.

8. The wire guard of claim 1, wherein the wire guard is 18 gauge steel.

9. The wire guard of claim 1, wherein the wire guard is 20 gauge steel.

10. The wire guard of claim 1, further including at least one bracket for surrounding a tab formed in the electrical box, the bracket being located where the perimeter wall is interrupted.

11. The wire guard of claim 10, wherein the bracket includes a flange having an aperture to align with a bore hole in the tab, and further wherein a fastener is passed through the aperture of the flange to engage the bore hole and fasten the wire guard to the electrical box.

* * * * *